United States Patent
Nabeshima

(10) Patent No.: US 12,513,433 B2
(45) Date of Patent: Dec. 30, 2025

(54) PHOTOELECTRIC CONVERSION DEVICE, IMAGE PROCESSING DEVICE, MOVABLE APPARATUS, PROCESSING METHOD, AND STORAGE MEDIUM FOR GENERATING A MAPPING PARAMETER

(71) Applicant: CANON KABUSHIKI KAISHA, Tokyo (JP)

(72) Inventor: Takuya Nabeshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 18/738,108

(22) Filed: Jun. 10, 2024

(65) Prior Publication Data
US 2024/0430595 A1 Dec. 26, 2024

(30) Foreign Application Priority Data
Jun. 26, 2023 (JP) .................. 2023-104159

(51) Int. Cl.
*H04N 25/773* (2023.01)
*G06T 7/11* (2017.01)
(Continued)

(52) U.S. Cl.
CPC ............ *H04N 25/773* (2023.01); *G06T 7/11* (2017.01); *H04N 23/611* (2023.01);
(Continued)

(58) Field of Classification Search
CPC .. H04N 25/773; H04N 23/611; H04N 25/779; H04N 25/7795; H04N 23/82; G06T 7/11; G06T 2207/10024
See application file for complete search history.

(56) References Cited

U.S. PATENT DOCUMENTS 7,030,923 B2 * 4/2006 Ide .................. H04N 23/10
348/312
10,417,476 B2 * 9/2019 Chang ............. H04N 23/71
(Continued)

FOREIGN PATENT DOCUMENTS

EP 2979134 A1 2/2016
JP 7223070 B2 2/2023

OTHER PUBLICATIONS

Extended European Search Report issued by the European Patent Office on Nov. 13, 2024 in corresponding EP Patent Application No. 24180702.3.

*Primary Examiner* — Chiawei Chen
(74) *Attorney, Agent, or Firm* — Carter, DeLuca & Farrell LLP

(57) ABSTRACT

A photoelectric conversion device has a plurality of pixels each of which is configured to include a sensor unit that generates a pulse at a frequency corresponding to a photon reception frequency, and a counter that counts a number of the pulses. The plurality of pixels are controlled such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period. In addition, the photoelectric conversion device generates a mapping parameter and performs tone mapping processing on the image signal using the mapping parameter.

15 Claims, 15 Drawing Sheets

(51) Int. Cl.
     *H04N 23/611*      (2023.01)
     *H04N 25/76*      (2023.01)
     *H04N 25/779*      (2023.01)

(52) U.S. Cl.
     CPC ....... *H04N 25/779* (2023.01); *H04N 25/7795* (2023.01); *G06T 2207/10024* (2013.01)

(56) References Cited

U.S. PATENT DOCUMENTS

| | | | |
|---|---|---|---|
| 11,258,957 B2* | 2/2022 | McElvain | H04N 23/73 |
| 2009/0086046 A1* | 4/2009 | Reilly | H04N 23/73 |
| | | | 348/E5.037 |
| 2018/0338102 A1 | 11/2018 | Saito | |
| 2019/0191120 A1* | 6/2019 | Ikedo | H04N 25/771 |
| 2019/0246041 A1* | 8/2019 | Blott | G06V 10/764 |
| 2022/0182625 A1* | 6/2022 | Danielsson | H04N 19/119 |
| 2023/0017160 A1* | 1/2023 | Cauvin | G06T 5/40 |
| 2023/0071218 A1* | 3/2023 | Ota | H04N 23/959 |
| 2024/0078648 A1* | 3/2024 | Kornienko | G06T 5/92 |
| 2024/0257308 A1* | 8/2024 | Namiki | G06T 5/92 |
| 2024/0406574 A1 | 12/2024 | Saito | |
| 2024/0406598 A1 | 12/2024 | Saito | |

\* cited by examiner

F1_1  F1_2  F1_3  F1_4

PHOTOELECTRIC CONVERSION DEVICE, IMAGE PROCESSING DEVICE, MOVABLE APPARATUS, PROCESSING METHOD, AND STORAGE MEDIUM FOR GENERATING A MAPPING PARAMETER

BACKGROUND OF THE INVENTION

Field of the Invention

The present invention relates to technologies such as image processing in photoelectric conversion device, and the like.

Description of the Related Art

In recent years, photoelectric conversion device that digitally count a number of photons that become incident upon an avalanche photo diode (APD) and output the counted value from a pixel to serve as a digital signal that has been photoelectrically converted have been developed. In addition, for example, Japanese Patent No. 7223070 discloses a configuration in a photoelectric conversion device having APDs that is able to output a plurality of video images for which the accumulation periods overlap with each other, and continuous image capturing thereby becomes possible even in low illumination Incidentally, vehicle-mounted camera systems often perform dynamic range expansion (HDR). The bit depth of pixels in image signals that have been acquired from HDR sensors is deep, and the transmission rate thereof becomes large. There is a limit to the transmission band for image signals, and therefore, there are many sensors that are equipped with a tone compression means such as tone mapping or the like. As a parameter for the tone compression, when used in viewing, human visual characteristics are taken into consideration, and there is a feature in which the compression ratio for the high luminance side is high.

As the vehicle-mounted camera, a camera is used with the goal of autonomous driving and collision prevention. Therefore, it is necessary to prevent accidents in advance by performing recognition processing on images as rapidly as possible, and controlling the vehicle based on these recognition results.

However, in the case of conventional image tone compression methods, there are many cases in which the compression ratio is set as high for the high luminance side in particular. In a case in which recognition processing is performed for an image with such compression ratio settings, the tone information decreases in pixel regions that have a luminance with a high compression ratio, and therefore, it is possible that the recognition precision will also decrease.

SUMMARY OF THE INVENTION

The present disclosure provides a technology that is able to suppress decreases in the image recognition precision.

A photoelectric conversion device according to one embodiment of the present disclosure comprises a plurality of pixels each of which is configured to include a sensor unit that generates a pulse at a frequency corresponding to a photon reception frequency, and a counter that counts a number of the pulses; and at least one processor or circuit configured to function as: a control unit configured to control the plurality of pixels such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period; and a processing unit configured to generate a mapping parameter and perform tone mapping processing on the image signal using the mapping parameter.

Further features of the present invention will become apparent from the following description of exemplary embodiments (with reference to the attached drawings).

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
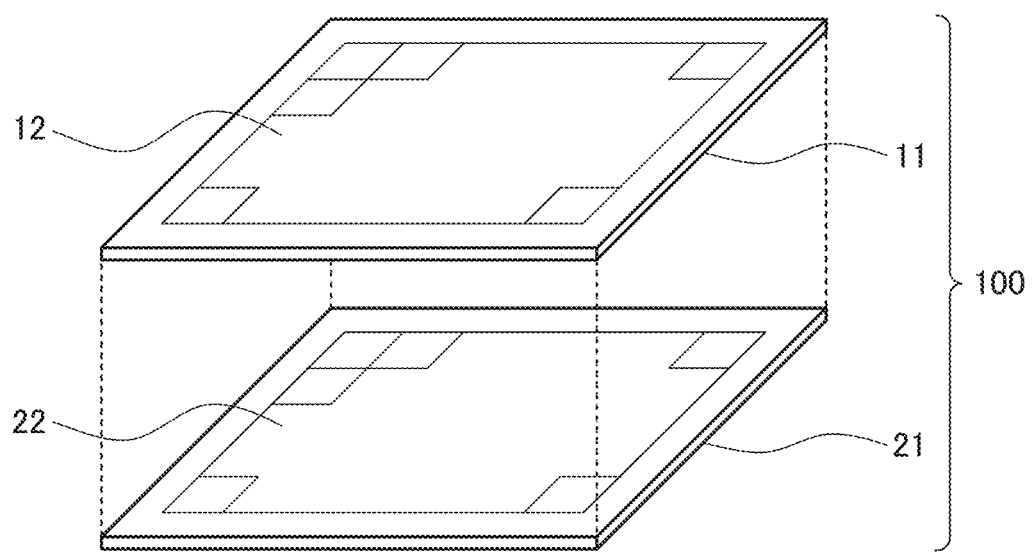
FIG. 1 is a diagram that shows a configurational example of a photoelectric conversion element according to an embodiment of the present disclosure.

FIG. 1 is a diagram showing a configurational example of a photoelectric conversion element according to the First Embodiment. Below, an explanation will be given using an example of a photoelectric conversion device with a so-called laminated structure that is configured by a photoelectric conversion element 100 being laminated with and electrically connected to the two boards of a sensor substrate 11, and a circuit substrate 21.

However, the photoelectric conversion device may also have a so-called non-laminated structure, in which the configurations that are included in the sensor substrate and the configurations that are included in the circuit substrate have been placed on the same semi-conductor. The sensor substrate 11 comprises a pixel region 12. The circuit substrate 21 comprises a circuit region 22 in which a signal that has been detected in the pixel region 12 is processed.

Figure 2:
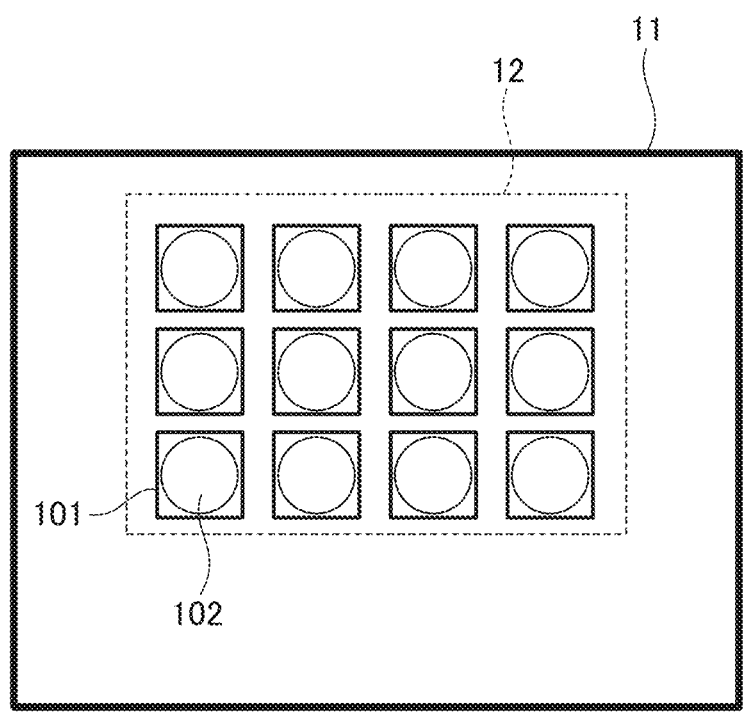
FIG. 2 is a diagram that shows a configurational example of a sensor substrate.

FIG. 2 is a diagram showing a configurational example of the sensor substrate 11. The pixel region 12 of the sensor substrate 11 comprises a plurality of pixels 101 that have been disposed 2-dimensionally across a plurality of rows and columns. A pixel 101 is provided with a photoelectric conversion unit 102 that comprises an avalanche photo diode (referred to below as an APD).

In this context, the photoelectric conversion unit 102 functions as a sensor unit that generates a pulse at a frequency corresponding to a frequency of photon reception. Note that the number of rows and the number of columns for the pixel array that forms the pixel region 12 are not particularly limited.

Figure 3:
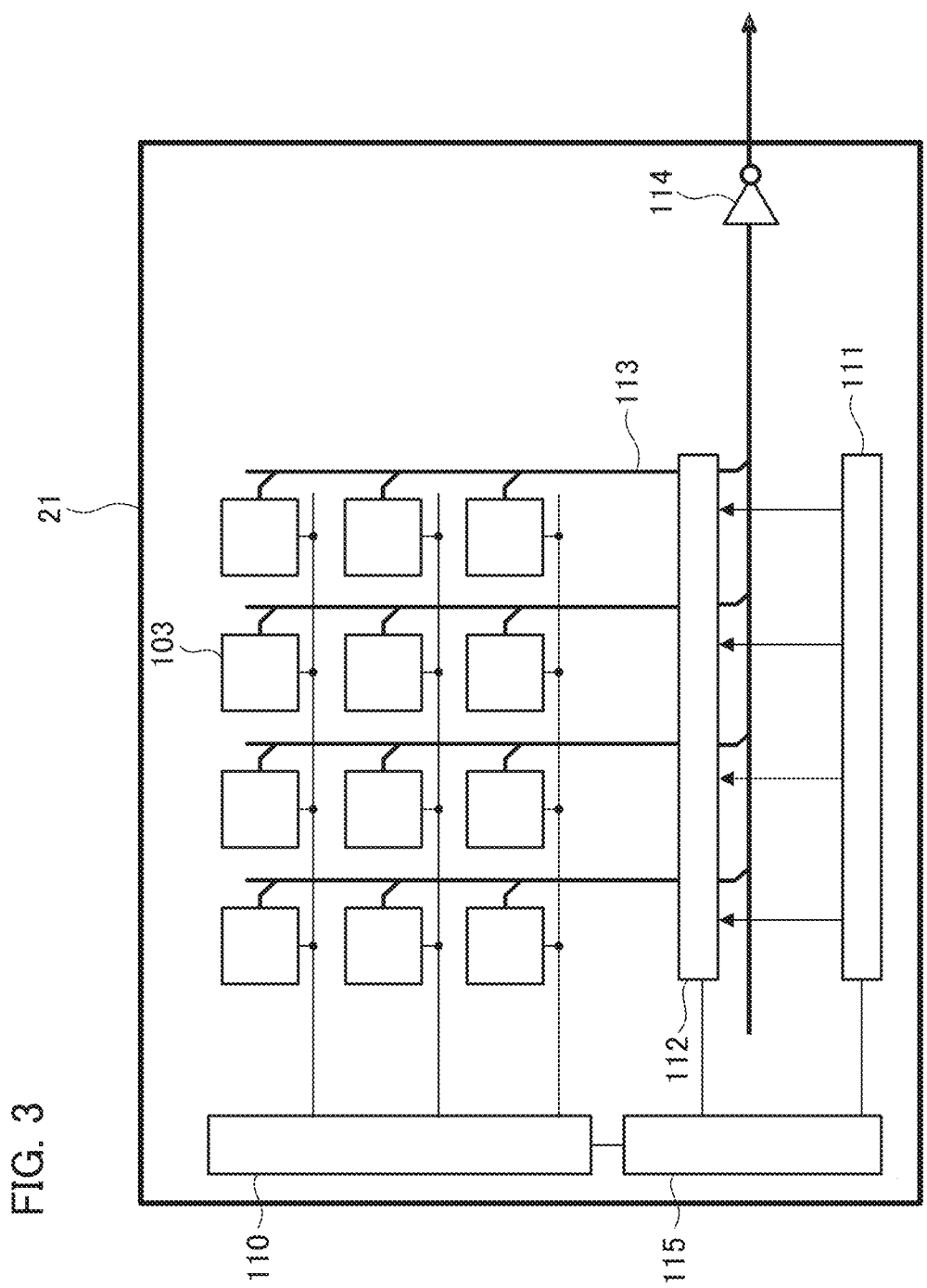
FIG. 3 is a diagram that shows a configurational example of a circuit substrate.

FIG. 3 is a diagram showing a configurational example for a circuit substrate 21. The circuit substrate 21 has a signal processing circuit 103 that processes electric charges that has been photoelectrically converted by each of the photoelectric conversion units 102 in FIG. 2, a read-out circuit 112, a control pulse generating unit 115, a horizontal scanning circuit 111, a vertical signal line 113, a vertical scanning circuit 110, and an output circuit 114.

The vertical scanning circuit 110 receives a control pulse that has been supplied from the control pulse generating unit 115, and supplies the control pulse in order to the plurality of pixels that have been arranged in the row direction. The logical circuits of a shift register and an address decoder are used in the vertical scanning circuit 110.

The signals that have been output from the photoelectric conversion units 102 for each pixel are processed in each signal processing circuit 103. The signal processing circuit 103 is provided with a counter (a counter circuit 211 of FIG. 4), and a memory (a memory circuit 212 of FIG. 4), which will be described below, and the like, and digital values are held in the memory. The horizontal scanning circuit 111 inputs a control pulse that selects each column in order into the signal processing circuit 103 in order to read-out signals from the memory of each pixel on which a digital signal has been held.

A signal is output to the vertical signal line 113 from the signal processing circuits 103 for the pixels in a row that has been selected by the vertical scanning unit 110. The signal that is output to the vertical signal line 113 is output to outside of the photoelectric conversion element 100 via the read-out circuit 112 and the output circuit 114. A plurality of buffers that have been connected to the vertical signal line 113 are encased in the read-out circuit 112.

As is shown in FIG. 2, and FIG. 3, a plurality of signal processing circuits 103 are disposed in a region that overlaps in the planar view with the pixel region 12. In addition, the vertical scanning circuit 110, the horizontal scanning circuit 111, the read-out circuit 112, the output circuit 114, and the control pulse generating unit 115 are disposed so as to overlap between the edge of the sensor substrate 11 and the edge of the pixel region 12 in the planar view.

That is, the sensor substrate 11 has the pixel region 12 and a non-pixel region that has been disposed around the pixel region 12. In addition, the vertical scanning circuit 110, the horizontal scanning circuit 111, the read-out circuit 112, the output circuit 114, and the control pulse generating unit 115 are disposed in a region that overlaps with the non-pixel region in the planar view.

Note that the position of the vertical signal line 113, and the positions of the read-out circuit 112 and the output circuit 114 are not limited to the example that is shown in FIG. 3. For example, the vertical signal line 113 may be placed so as to extend in the direction of the rows, and the read out circuit 112 may also be positioned at the end of the extension of the vertical signal line 113. In addition, it is not absolutely necessary for a signal processing circuit 103 to be provided for each and every photoelectric conversion unit, and this may also be a configuration in which one signal processing unit is shared by a plurality of photoelectric conversion units, and signal processing is performed in order.

Figure 4:
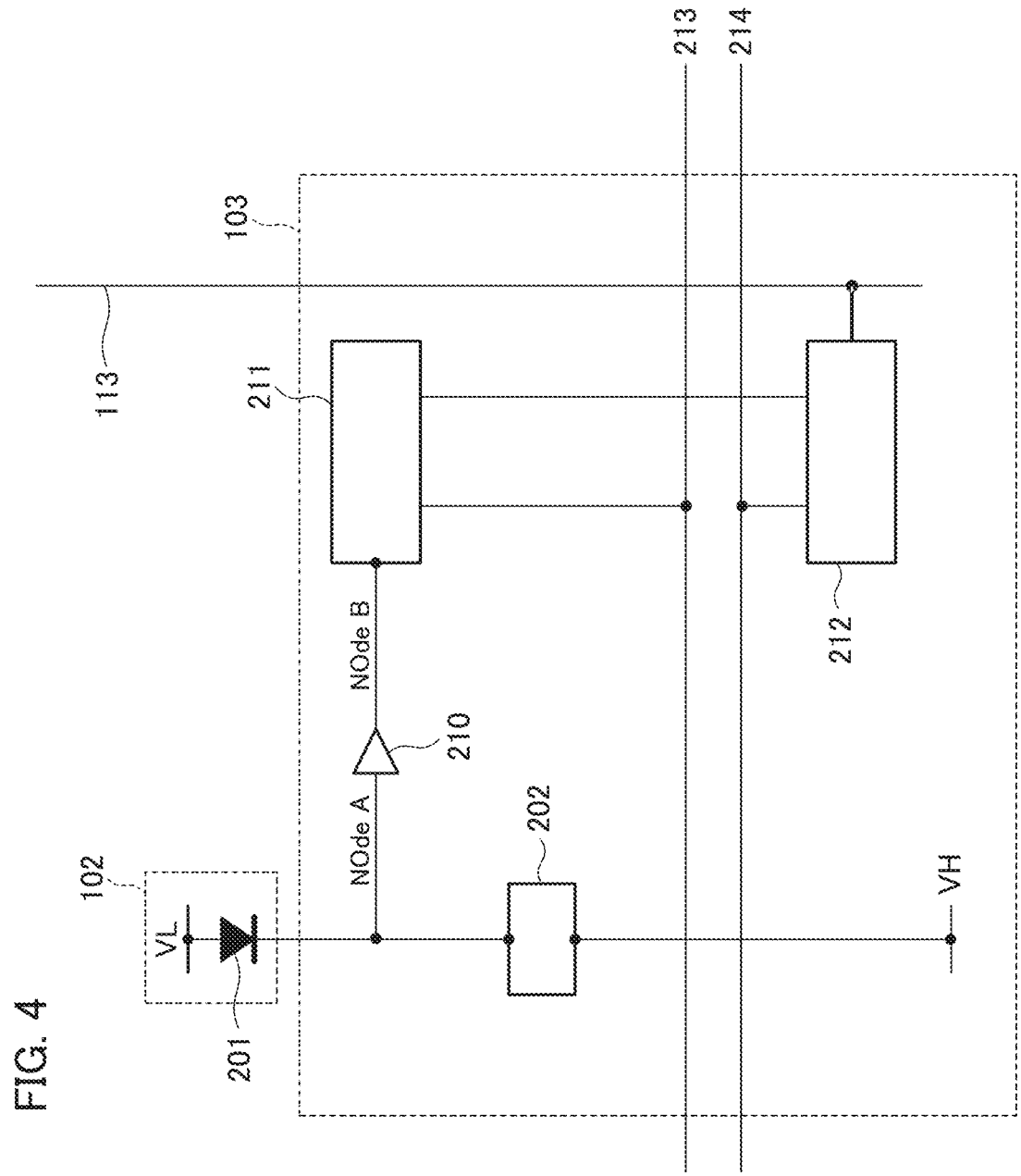
FIG. 4 is a diagram that shows, from among FIG. 2, and FIG. 3, a pixel, and an equivalent circuit for a signal processing circuit corresponding to the pixel.

FIG. 4 is a diagram showing the pixel 101 from FIG. 2, and FIG. 3, and an equivalent circuit for the signal processing circuit 103 corresponding to the pixel 101.

An APD 201 that is included in the photoelectric conversion unit 102 generates a charge pair according to the incidence of light due to photoelectric conversion. One node from among the two nodes for the APD 201 is connected to a power source that supplies a drive voltage VL (a first voltage). In addition, the other node from among the two nodes of the APD 201 is connected to a power source that supplies a drive voltage VH that is higher than the voltage VL (a second voltage).

In FIG. 4, the one node of the APD 201 is an anode, and the other node of the APD is a cathode. The anode and cathode of the APD 201 are supplied with a reverse bias voltage such that the APD 201 performs avalanche multiplication operations. By making this a state in which such a voltage has been supplied, the charge created by the incidence of light causes avalanche multiplication, and an avalanche current is generated.

Note that in a case in which a reverse bias voltage is supplied, there is a Geiger mode in which the APD is made to operate at a voltage difference in which the voltage difference of the anode and the cathode is larger than the breakdown voltage, and a linear mode in which the APD is made to operate at a voltage difference in which the voltage difference for the anode and the cathode is around the vicinity of or lower than the breakdown voltage. An APD that is made to function in a Geiger mode is referred to as a SPAD. In the case of a SPAD, for example, the drive voltage VL (the first voltage) is −30V, and the drive voltage VH (the second voltage) is 1V.

The signal processing circuit 103 has a quenching element 202, a waveform shaping unit 210, a counter circuit 211, and a memory circuit 212. The quenching element 202 is connected to the power source that supplies the drive voltage VH, and one node from among the anode and the cathode of the APD 201.

The quenching element 202 functions as a load circuit (a quenching circuit) at the time of signal amplification by avalanche multiplication, and has operations that control the voltage supplied to the APD 201 and control the avalanche multiplication (quenching operation). In addition, the quenching element 202 has operations that return the voltage that is supplied to the APD 201 to the drive voltage VH by flowing an electric current for the amount that is voltage dropped during the quenching operation (a recharging operation).

FIG. 4 shows an example in which the signal processing circuit 103 has the waveform shaping unit 210, the counter circuit 211, and the memory circuit 212 in addition to the quenching element 202.

The waveform shaping unit 210 shapes voltage changes in the cathode of the APD 201 that are obtained at the time of photon detection, and outputs a pulse signal. For example, an inverter circuit is used as the waveform shaping unit 210. Although in FIG. 4, an example has been shown in which one inverter is used as the waveform shaping unit 210, a circuit in which a plurality of inverters have been connected in series may also be used, or any other circuit having a waveform shaping effect may also be used.

The counter circuit 211 counts the number of pulses that have been output from the waveform shaping unit 210, and holds the counted value. In addition, when a control pulse RES has been provided via a drive line 213, the signal that has been held in the counter circuit 211 is reset. In this context, the counter circuit 211 generates a signal based on a difference between count values for the start time and the end time of an accumulation period.

A control pulse SEL is supplied to the memory circuit 212 from the vertical scanning circuit 110 of FIG. 3 via the drive line 214 of FIG. 4 (not shown in FIG. 3), and the counter circuit 211 and the vertical signal line 113 switch between being electrically connected and not connected. The memory circuit 212 functions as a memory that temporarily stores count values of the counter, and outputs an output signal from the counter circuit 211 for a pixel to the vertical signal line 113.

Note that a switch such as a transistor or the like may also be placed between the quenching element 202 and the APD 201, and between the photoelectric conversion unit 102 and the signal processing circuit 103, and this may be used to switch their electric connection on and off. In the same manner, a switch such as a transistor or the like may also be used to electrically switch the supply of the drive voltage VH or the drive voltage VL that are supplied to the photoelectric conversion unit 102 on and off.

Figure 5:
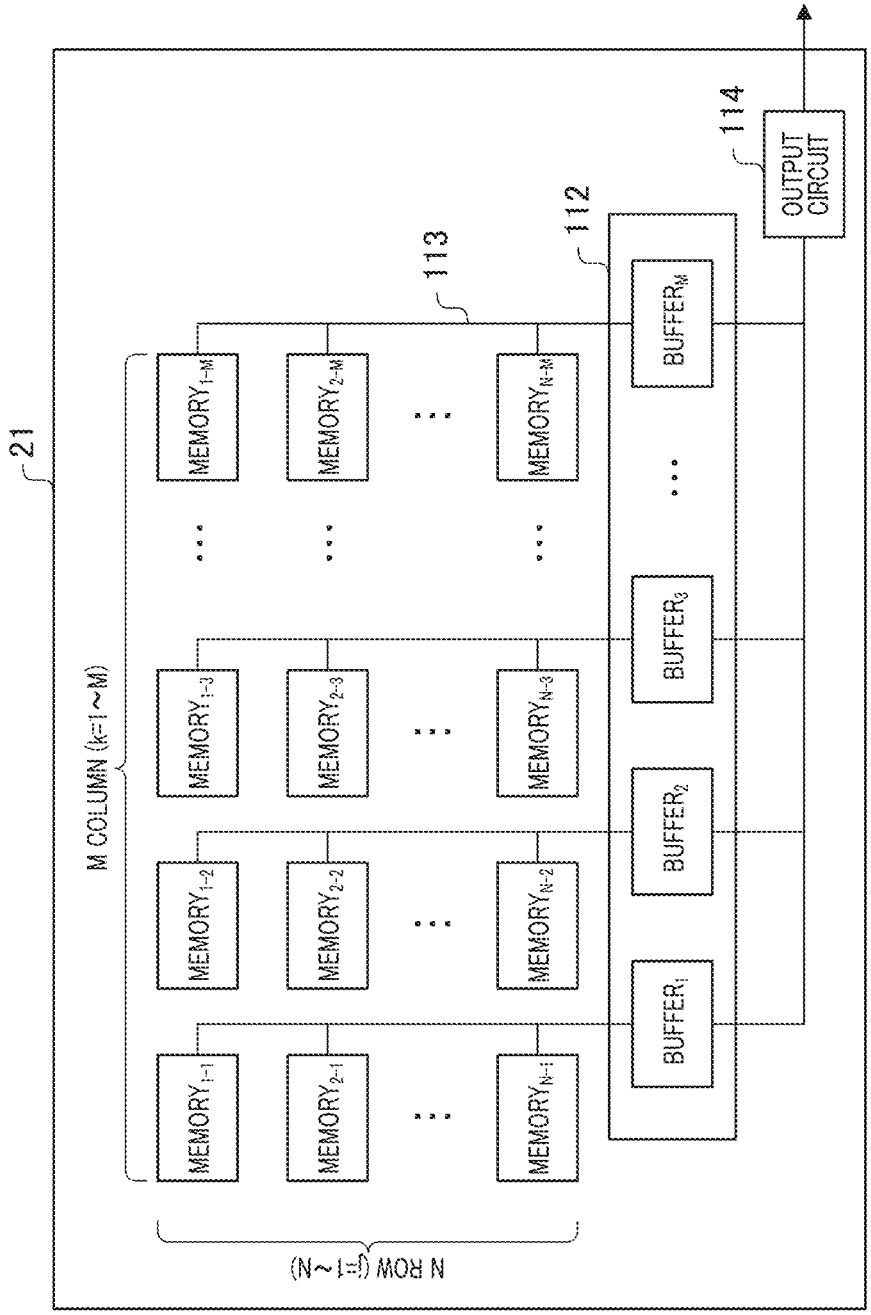
FIG. 5 is a diagram that shows relationships between memory boards and buffers according to an embodiment.

FIG. 5 is a diagram showing the relationship between the memory circuits and the buffers according to the Present Embodiment. FIG. 5 shows a state in which the memory circuit 212 inside of the signal processing circuit 103 of FIG. 3 is arranged in N rows and M columns, and this is shown such that each memory circuit is memory 1-1 to memory N-M. In addition, the buffer 1 to buffer M in FIG. 5 show the buffers that are included in the read-out circuit 112 in FIG. 3. The output circuit 114 in FIG. 5 corresponds to the output circuit 114 in FIG. 3.

Figure 6:
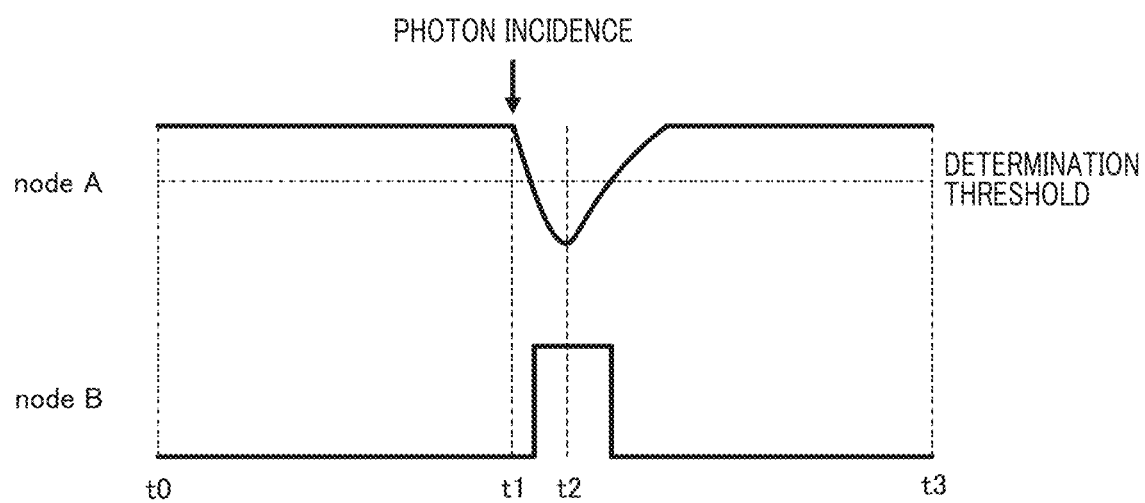
FIG. 6 is a diagram that schematically shows a relationship between operations of an APD and an output signal.

FIG. 6 is a diagram that schematically shows the relationship between the operations of the APD 201 and the output signal. The input side of the waveform shaping unit 210 is made a nodeA, and the output side of the waveform shaping unit 210 is made a nodeB. During the time t0 to the time t1, the potential difference VH-VL is applied to the APD 201. At the time t1, upon photons becoming incident on the APD 201, avalanche multiplication occurs in the APD 201, an avalanche multiplication current flows through the quenching element 202, and the voltage for the nodeA is lowered.

Upon the voltage drop amount further increasing and the potential difference that is being applied to the APD 201 becoming smaller, as at the time t2, the avalanche multiplication for the APD 201 is stopped, and it becomes such that the voltage level for the nodeA will not drop below a fixed value.

After this, during the time from the time t2 to the time t3, a current that compensates for the voltage drop amount is flowed through the nodeA from the voltage VL, and at the time t3, the nodeA becomes statically determinate at its original potential level. At this time, the portions of the output waveform in the nodeA that have exceeded a specific threshold are waveform shaped by the waveform shaping unit 210, and output as the pulse signal in the nodeB.

Figure 7:
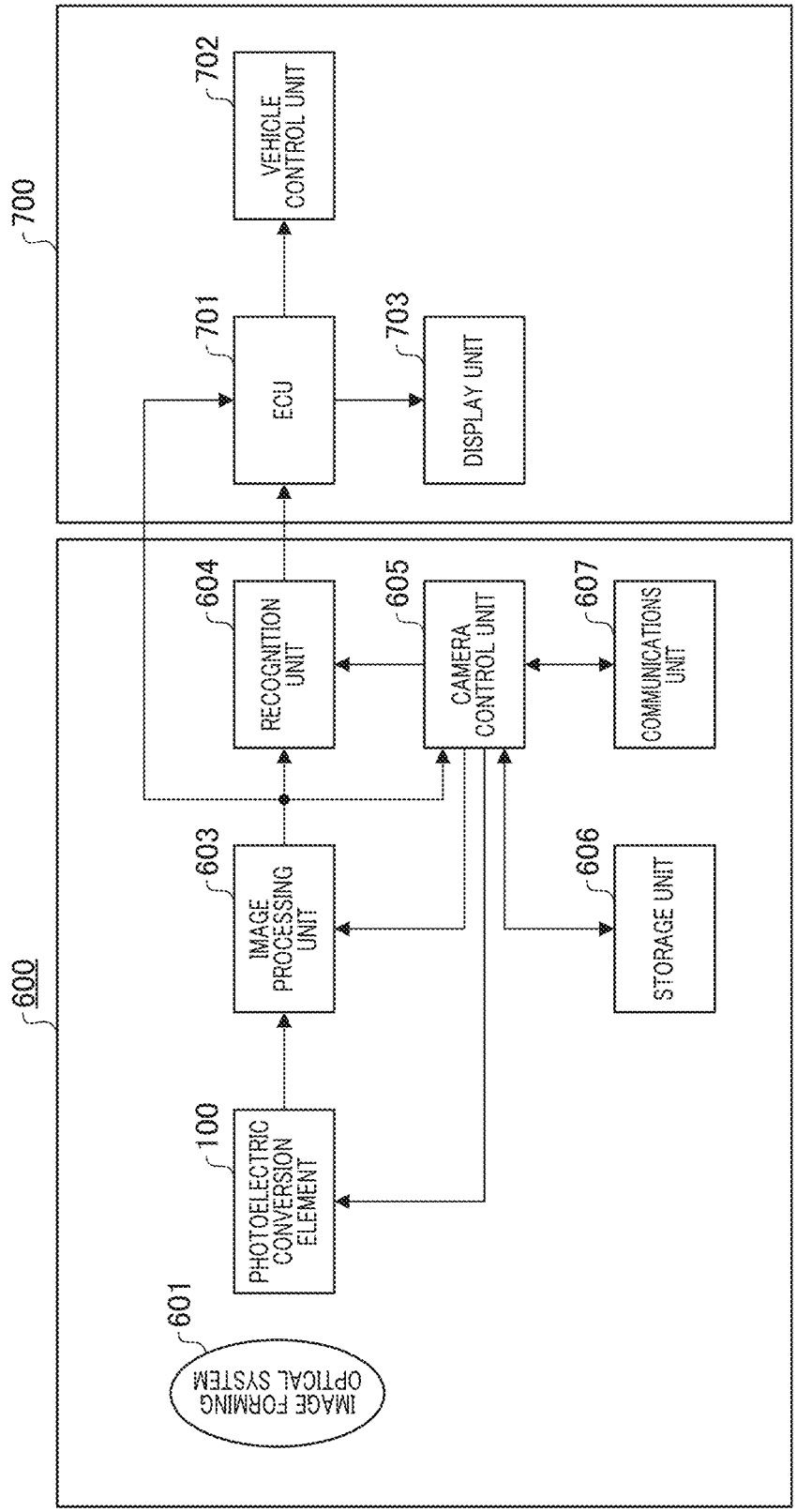
FIG. 7 is a functional block diagram for a photoelectric conversion device and a movable apparatus according to an embodiment.

Next, a photoelectric conversion device 600 and a movable apparatus 700 of the Present Embodiment will be explained. FIG. 7 is a functional block diagram showing the photoelectric conversion device 600 and the movable apparatus 700 according to the Present Embodiment. Note that a portion of the functional blocks that are shown in FIG. 7 are realized by computers that are not shown but that are included in the photoelectric conversion device 600 and the movable apparatus 700 executing a computer program that has been stored on a memory serving as a storage medium, which is also not shown.

However, it may also be made such that a portion or the entirety thereof are realized by hardware. As the hardware, an application specific-integrated circuit (ASIC), a processor (a reconfigurable processor, a DSP) or the like can be used. In addition, each of the functional blocks that are shown in FIG. 7 do not need to be housed in the same body, and may also be configured by separated apparatuses that have been connected to each other by a signal path. Note that the above explanation in relation to FIG. 7 also applies to FIG. 8 and FIG. 13, which will be explained below.

The photoelectric conversion device 600 has the photoelectronic conversion element 100 that was explained in FIG. 1 to FIG. 6, an image forming optical system 601, an image processing unit 603, a recognition unit 604, a camera control unit 605, a storage unit 606, a communications unit 607, and the like. The photoelectric conversion element 100 is configured by the avalanche photodiodes for photoelectrically converting an optical image, which were explained in FIG. 1 to FIG. 6.

The photoelectric conversion device 600 of the Present Embodiment is loaded onto the movable apparatus 700, and is configured such that a camera unit that comprises a set of the image forming optical system 601 and the photoelectric conversion element 100 captures images of, for example, at least one direction from among the front direction, the rear direction, and the side direction of the movable apparatus. Note that a plurality of camera units may also be provided to the movable apparatus 700.

The image processing unit 603 is a block that performs necessary image processing on an image signal that has been acquired from the photoelectric conversion element 100, and functions as an image processing device. In the Present Embodiment, in addition to the tone mapping that will be described below, the image processing unit 603 also performs processing such as, for example, black level correction, gamma curve adjustment, noise reduction, digital gain adjustment, de-mosaic processing, white balance adjustment, color conversion, or the like, and generates a final image.

In addition, the output from the image processing unit 603 is supplied to the recognition unit 604, an ECU (electric control unit) 701 of the movable apparatus 700, and the camera control unit 605. The recognition unit 604 recognizes surrounding people, vehicles, and the like by performing image recognition based on the image signal, and generates warnings or the like according to necessity.

Note that although in the Present Embodiment, an explanation is given using an example in which the movable apparatus 700 is, for example, an automobile, the movable apparatus may also be any apparatus that is movable, such as an airplane, a train, a ship, a drone, an AGV, a robot, or the like.

The camera control unit 605 houses a CPU that functions as a computer and a memory on which a computer program has been stored, and the CPU performs control of each unit of the photoelectric conversion device 600 by executing the computer program that has been stored on the memory.

Note that the camera control unit 605 is one example of a control unit, and control of the length of the accumulation periods for each frame of the photoelectric conversion element 100, the timing of a control signal CLK, or the like are performed via, for example, a control pulse generating unit of the photoelectric conversion element 100.

The storage unit 606 includes, for example, storage mediums such as a memory card, a hard disk, or the like, and is able to store and read out an image signal. The communications unit 607 is provided with a wireless or wired interface, and outputs the image signal that has been generated to outside of the photoelectric conversion device 600, along with receiving each type of signal from outside of the photoelectric conversion device.

The ECU 701 houses a CPU that serves as a computer and a memory on which a computer program has been stored, and performs control of each unit of the movable apparatus 700 by the CPU executing the computer program that has been stored on the memory.

The output of the ECU 701 is supplied to a vehicle control unit 702 and a display unit 703. The vehicle control unit 702 is one example of a movement control unit that performs the drive, stopping, directional control, and the like of a vehicle that is serving as a movable apparatus based on the output of the ECU 701. In addition, the display unit 703 is one example of a display unit that includes, for example, display elements such as a liquid crystal display, an organic EL, or the like, and is provided to the movable apparatus 700. Note that the vehicle control unit 702 controls the operations of the movable apparatus based on the results of recognition processing using a signal that is generated during at least a first accumulation period.

The display unit 703 displays images that have been acquired from the photoelectric conversion element 100, and each type of information relating to the driving state or the like of the vehicle, to an operator of the movable apparatus 700 by using, for example, a GUI based on the output from the ECU 701.

Note that the image processing unit 603 and the recognition unit 604 and the like in FIG. 7 do not necessarily need to be loaded onto the movable apparatus 700, and for example, may also be provided to an external terminal or the like that has been provided separately from the movable apparatus 700 for remotely controlling the movable apparatus 700, or for monitoring the driving of the movable apparatus.

Figure 9:
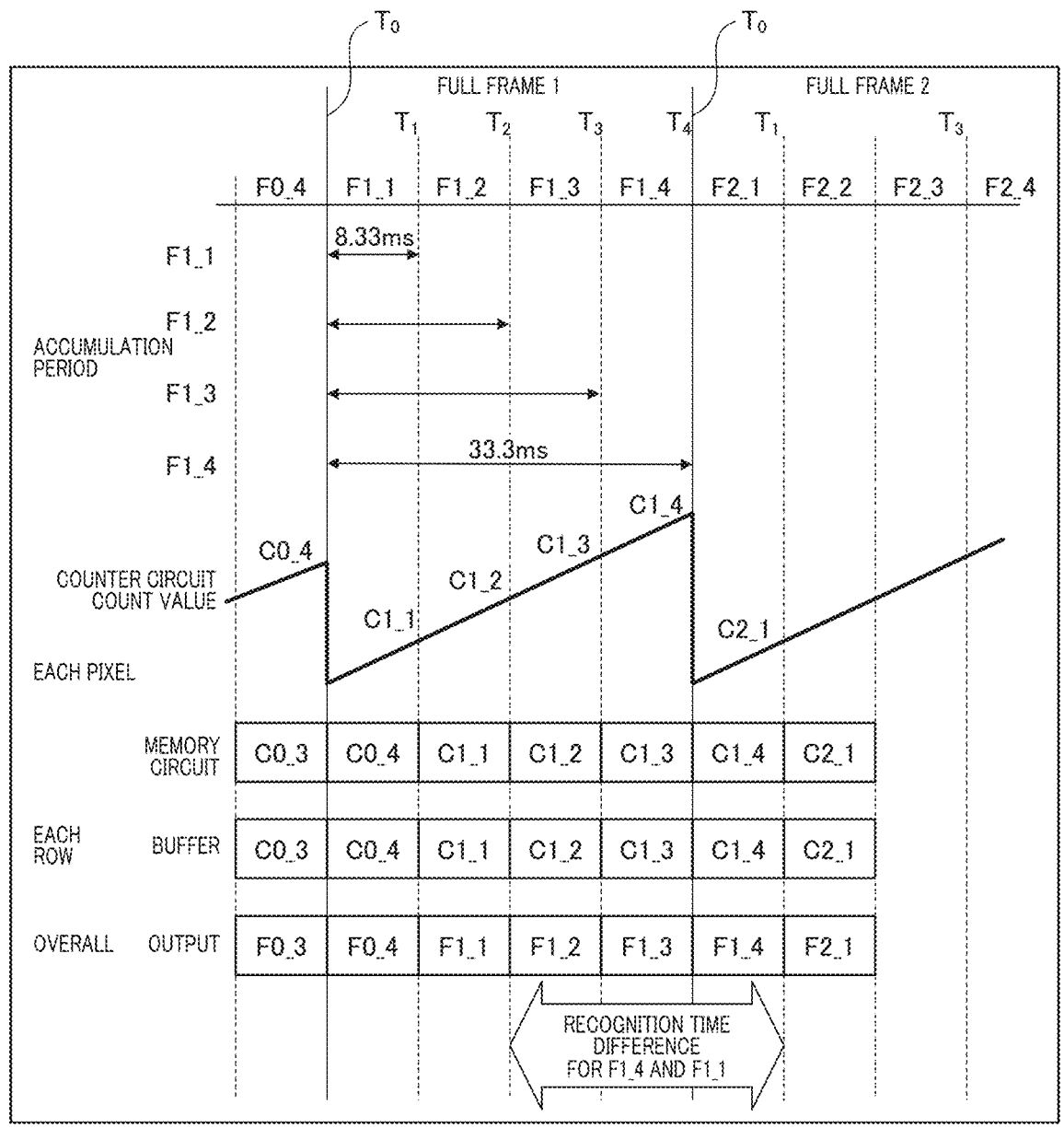
FIG. 9 is a diagram that explains a photoelectric conversion method by a camera control unit according to an embodiment.

FIG. 9 is a diagram explaining a photoelectric conversion method by the camera control unit 605 according to the Present Embodiment. In the Present Embodiment, photoelectric conversion is periodically performed at, for example, 30 frames per second (the time length of one frame is 33.3 m), and this one frame for which the length is 33.3 ms is divided into four. That is, as is shown in FIG. 9, a frame 1 is segmented into the approximately even periods (8.33 ms) of frame 1_1, frame 1_2, frame 1_3, and frame 1_4.

In the Present Embodiment, one frame with a length of 33.3 ms is referred to as a full frame, and a full frame that has been segmented into four is referred to as a frame. Note that in the figures after FIG. 9, the frames 0_3, 0_4, 1_1, 1_2, 1_3, 1_4, 2_1, and 2_2 are shown as F0_3, 0_4, 1_1, 1_2, 1_3, 1_4, 2_1, and 2_2.

The camera control unit 605 performs accumulation operations for a plurality of different accumulation periods during a full frame period (accumulation operations for a signal corresponding to the count value of the counter circuit 211). For example, the frame 1_1 has the accumulation periods for the full frame 1 from the time T0 until the time T1, and the frame 1_2 has the accumulation periods from the time T0 to the time T2. In addition, the frame 1_3 has the accumulation periods from the time T0 to the time T3, and the frame 1_4 has the accumulation periods from the time T0 to the time T4. In the Present Embodiment, for example, the accumulation period from the time T0 to the time T1 is referred to as the first accumulation period, and the accumulation period from the time T0 to the time T4 is referred to as the second accumulation period.

At the times T1, T2, T3, and T4, which are each the terminuses of each of the frame 1_1, the frame 1_2, the frame 1_3, and the frame 1_4, the count values C1_1, C1_2, C1_3, and C1_4 are read out from the counter circuit 211. In contrast, at T0 (T4), which is the terminus of the full frame period (1 vertical period), the reset of the counter circuit 211 is performed by the above described control pulse RES.

The count values C1_1, C1_2, C1_3, and C1_4 that have been read out are temporarily stored in the memory circuit 212. In addition, the signals for one row that have been temporarily stored in the memory circuit 212 are successively output from the photoelectric conversion element 100 via the buffer of the read-out circuit 112, and input into the image processing unit 603. Note that the buffer stores the count values C1_1, C1_2, C1_3, and C1_4 for the amount for 1 to N rows (that is, for one frame).

In this manner, according to the Present Embodiment, the signal that has accumulated during the period for frame 1_1 is read out over the times T1 to T2, and processed in the recognition unit 604. It is thereby possible to rapidly perform image recognition. In the same manner, the signals that are accumulated in the periods for frame 1_2, frame 1_3, and frame 1_4 are each sequentially read out over each of the times T2 to T3, T3 to T4, and T4 to T1, and it is possible to continuously perform image recognition.

Figure 10:
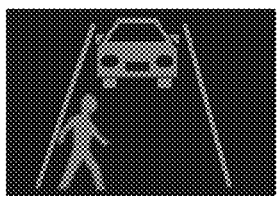
FIG. 10 is a diagram that shows an example of an image with a plurality of frames that have been segmented.
Figure 10:
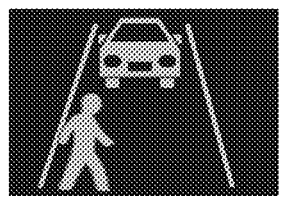
Figure 10:
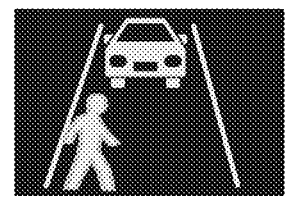
Figure 10:
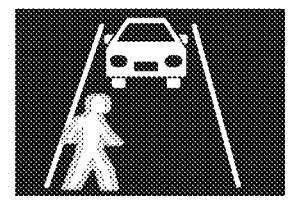

FIG. 10 is a diagram showing an example of images for a plurality of segmented frames. As is shown in FIG. 10, although the accumulation period is short and therefore the image for frame 1_1 becomes dark, the amount of subject blur for the person who has run into the road is small. In contrast, the accumulation time becomes longer in order for frame 1_2, frame 1_3, and frame 1_4, and therefore, it also becomes easier for subject blur to occur in this order. Note that it is difficult for blur to occur for stopped vehicles and the white lines, and the longer that the accumulation period is, the easier it is to improve the contrast.

In this manner, in the Present Embodiment, accumulation processing is performed for the first accumulation period and the second accumulation period within one full frame. In addition, the first accumulation period is shorter than the second accumulation period, and control is performed such that the signal that is generated during the first accumulation period is output during the time from the end of the first accumulation period until the end of the second accumulation period.

In addition, in the Present Embodiment, the first accumulation period and the second accumulation period overlap with each other, and the first accumulation period and the second accumulation period start at the same time. Furthermore, the end of the second accumulation period is the end of a full frame, and the second accumulation period is an integral multiple of the first accumulation period. That is, the end time of the second accumulation period matches the end time of the full frame.

However, it is not necessary that the second accumulation period be an integral multiple of the first accumulation period. It is sufficient as long as the second accumulation period is longer than the first accumulation period (the first accumulation period is shorter than the second accumulation period), and the end of the second accumulation period is after the end of the first accumulation period.

That is, an image for which the accumulation period is short and an image for which the accumulation period is long are made, the timing for when the short accumulation period ends is made earlier than the timing for when the long accumulation period ends, and once the short accumulation period finishes, this image is output and sent to the recognition unit 604, which will be described below. In addition, subjects are recognized based on a signal that is generated during at least the first accumulation period. The recognition unit 604, which is one example of a recognition unit, recognizes subjects based on a signal that is generated during at least the first accumulation period.

Therefore, while in the prior art, image recognition could not be performed until one full frame had passed, in the Present Embodiment, it is possible to perform image recognition after ¼ of a full frame period at the shortest, and for example, when a movable apparatus is moving at a high velocity, it is possible to rapidly recognize obstacles or the like. Therefore, the movable apparatus is able to rapidly apply the brakes. Conversely, it also becomes possible to avoid obstacles at an early stage.

Note that it is possible to improve the contrast for images with long accumulation times, and therefore, these can be used as display images, That is, images that have a short accumulation time are suitable for rapid subject recognition, and images with long accumulation periods are suitable as images for display use. In this manner, the display apparatus according to the Present Embodiment displays a signal that is generated during at least a second accumulation period to serve as an image.

In addition, APDs are used in the Present Embodiment, and therefore, different than for a CMOS sensor, the charge that has been accumulated by read-outs does not deteriorate, and therefore it is possible to repeat the accumulation period. In addition, there is no read-out noise, and therefore, the original signal will not deteriorate no matter how many times read-out is performed during one accumulation.

In the Present Embodiment, the camera control unit 605 is one example of a control unit configured to control a plurality of pixels in the following manner. That is, a control unit configured to control the plurality of pixels such that a signal is generated based on a difference between count values for the counter between a start time and an end time for a plurality of different accumulation periods within a full frame period. In addition, the control unit also configured to control the plurality of pixels such that an image signal that is generated during a first accumulation period is output between a time from an end of the first accumulation period until an end of a second accumulation period.

Figure 8:
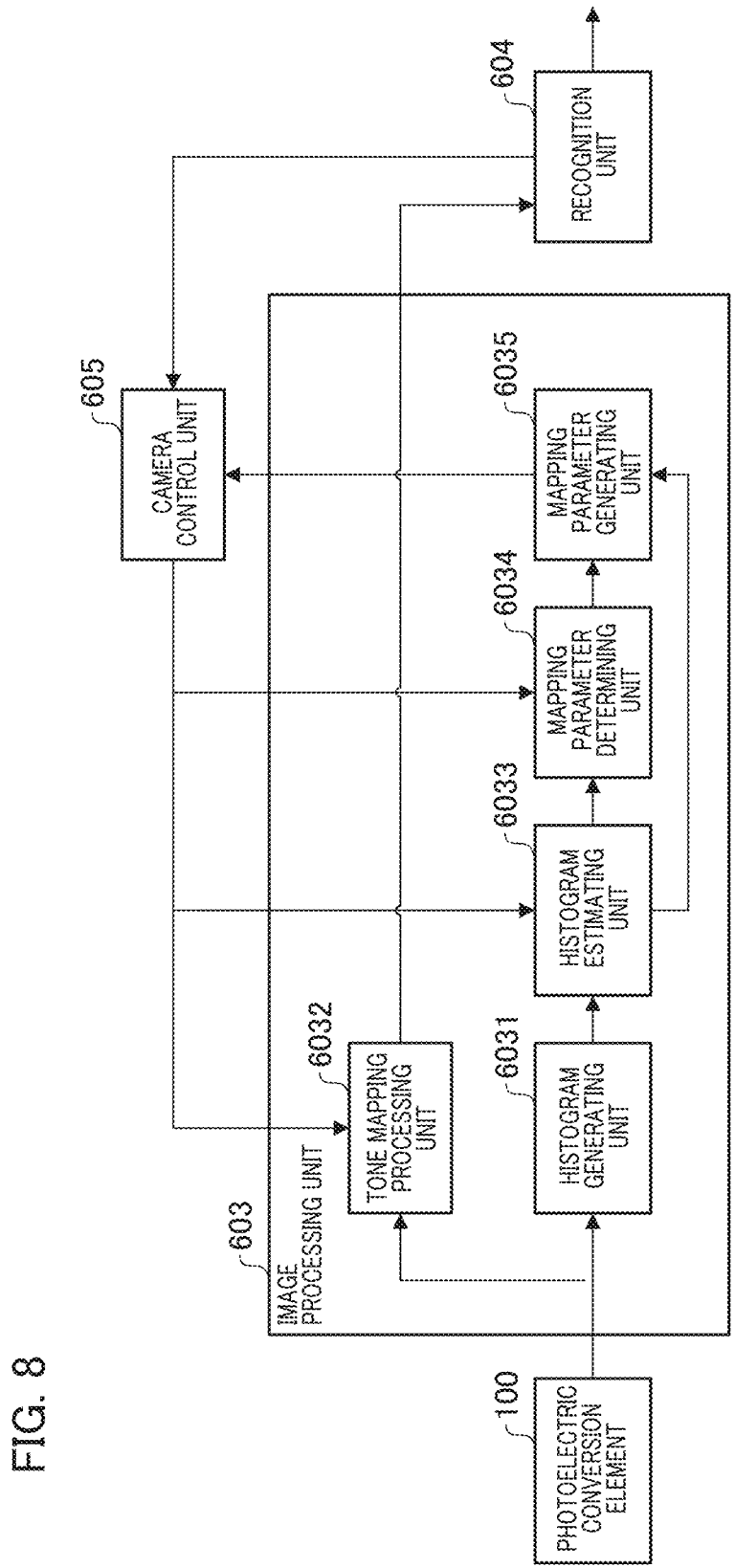
FIG. 8 is a block diagram that shows an example of a functional configuration of an image processing unit according to an embodiment.

FIG. 8 is a block diagram showing an example of a functional configuration predominantly of the image processing unit 603. The image processing unit 603 has a histogram generating unit 6031, a tone mapping processing unit 6032, a histogram estimating unit 6033, a mapping parameter determining unit 6034, and a mapping parameter generating unit 6035.

The histogram generating unit 6031 generates a histogram for a pixel value in relation to an image signal from a first accumulation period that is acquired by the photoelectric conversion element 100. The histogram generating unit 6031 outputs the histogram for the pixel value that has been generated to the histogram estimating unit 6033.

Figure 12:
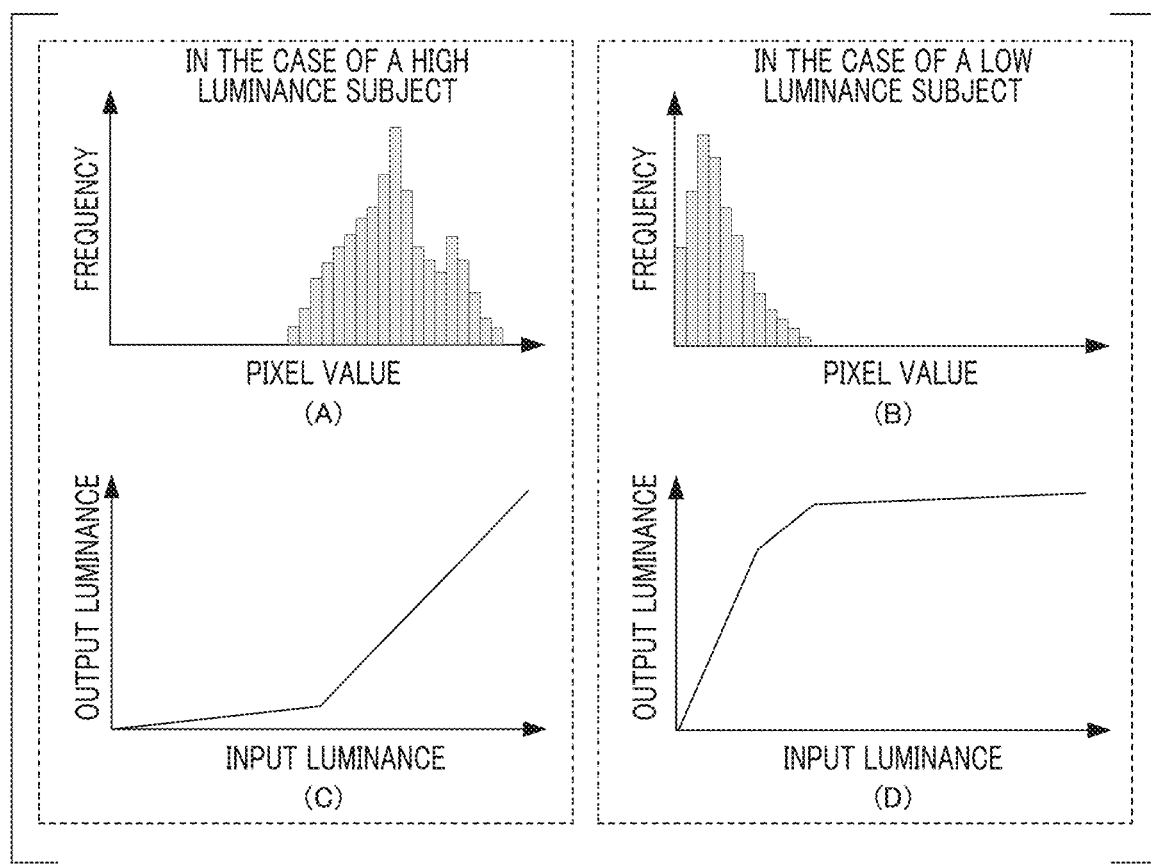
FIG. 12 (12(A)-12(D)) are diagrams that schematically show examples of histograms and mapping parameters.

The tone mapping processing unit 6032 performs mapping processing for the tone on the image signal for the first accumulation period that is acquired with the photoelectric conversion element 100. At this time, tone mapping processing is performed by using a mapping parameter (a tone mapping parameter) that have been generated by the mapping parameter generating unit 6035. The mapping parameter is information that shows the compression ratio defined per the luminance (or the pixel value) of each pixel. This will be explained below with respect to FIG. 12. By performing tone mapping processing, it is possible to compress the tone of the image signal. The image signal that has been output from the tone mapping processing unit 6032 is output to the recognition unit 604.

In the Present Embodiment, although the histogram generating unit 6031 and the tone mapping processing unit 6032 are placed parallel to each other, the tone mapping processing unit 6032 may also be placed more forward than the histogram generating unit 6031. In this case, it is preferable if tone mapping processing that condenses the dynamic range is not performed.

The histogram estimating unit 6033 estimates a histogram for pixel values during the second accumulation period from the histogram for the pixel values from during the first accumulation period that is generated by the histogram generating unit 6031 and the length of the second accumulation period. In this context, the histogram estimating unit 6033 estimates pixel values for during the second accumulation period by multiplying the pixel values for during the first accumulation period by the ratio of the first accumulation period to the second accumulation period, and is able to estimate a histogram for these pixel values. The histogram that is generated in this context is output to the mapping parameter determining unit 6034 and the mapping parameter generating unit 6035.

The mapping parameter determining unit 6034 compares a mapping parameter that is used in the tone mapping processing unit 6032, with the histogram for the pixel values during the second accumulation period, which was estimated by the histogram estimating unit 6033. The mapping parameter determining unit 6034 thereby determines if the mapping parameter that is used during the tone mapping processing is suitable mapping parameter.

The following method is one example of a method for determining whether or not the mapping parameter is suitable. There is a method in which, the compression ratio for the luminance of each pixel (the compression ratio due to the mapping parameter for the determination target) and the frequency of the pixel values for each luminance in the histogram that has been estimated are compared, and in a case in which a frequency at or above a threshold occurs at a luminance with a high compression rate, it is determined that the parameter is not suitable. The mapping parameter determining unit 6034 outputs the determination results that have been generated to the mapping parameter generating unit 6035.

The mapping parameter generating unit 6035 generates mapping parameter for during the second accumulation period based on the determination results that have been output from the mapping parameter determining unit 6034 and the histogram for the second accumulation period that has been output from the histogram estimating unit 6033. At this time, if mapping parameter is generated such that the compression ratio for a tone for which the frequency of pixel values is high becomes low, the lack of pixel values for the subject composition will become smaller. The mapping parameter that is generated by the mapping parameter generating unit 6035 are output to the camera control unit 605.

The camera control unit 605 transmits a control signal to each functional block. The camera control unit 605 receives the mapping parameter from the mapping parameter generating unit 6035 that was described above, and outputs these to the tone mapping processing unit 6032, and the mapping parameter determining unit 6034. In addition, the camera control unit 605 outputs information for the exposure times for the first accumulation period and the second accumulation period to the histogram estimating unit 6033.

In the Present Embodiment, the image processing unit 603 is one example of a processing unit that generates a mapping parameter, and performs tone mapping processing on the signal that is output using the mapping parameter.

Figure 11:
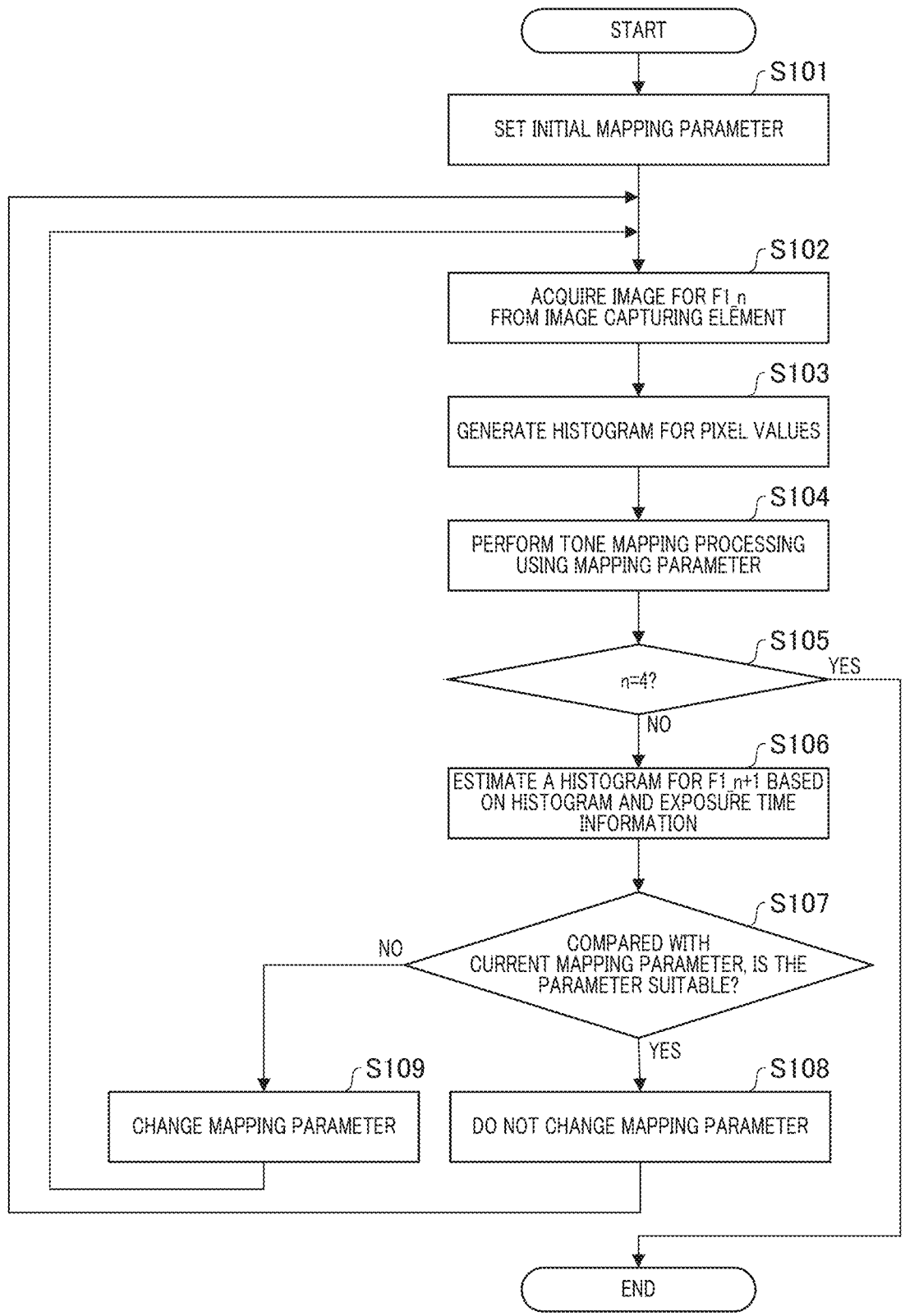
FIG. 11 is a flowchart that shows tone mapping processing according to an embodiment.

FIG. 11 is a flowchart showing tone mapping processing according to the First Embodiment. The present processing is realized by the CPU of the camera control unit 605 reading out a computer program according to the processing contents, loading this on a memory, and then executing it.

In step S101, the camera control unit 605 sets the initial values for the mapping parameter. At this time, the initial values for the mapping parameter may be values that are determined in advance, or they may also be values that are used for the previous frame.

In step S102, the camera control unit 605 acquires the image for the frame 1_*n* for the photoelectric conversion element 100. In this context, the frame 1_*n* shows the frame 1_1 to frame 1_4 in FIG. 9.

In step S103, the histogram generating unit 6031 generates a histogram for the pixel values using the image signal that is acquired.

In step S104, the tone mapping processing unit 6032 uses the mapping parameter that is set in step S101 and performs tone mapping processing. The bit depth (the quantization bit rate, or the tone number) of the image is thereby compressed.

In step S105, the camera control unit 605 confirms the frame that is the current target of the processing. In a case in which the frame that is the current processing target is frame 1_1, 1_2, or 1_3, the processing continues and transitions to step S106. In the case of frame 1_4, the frame is completed and the processing transitions to the next frame 2_1. In this context, the greatest value for n is one example, and this may also be a value other than n=4.

In step S106, the histogram estimating unit 6033 estimates a histogram of the pixel values in the image for frame 1_*n*+1 from the histogram that is generated in step S103, and the information for the exposure time (accumulation period) for the frame 1_*n*+1.

In step S107, the mapping parameter determining unit 6034 compares the estimated values for the histogram that is estimated in step S106, and the mapping parameter that is used in step S104, and determines whether or not these are suitable mapping parameter. In the case in which they are suitable the processing transitions to step S108. In the case in which they are not suitable, the processing transitions to step S109.

In step S108, because it is determined in step S107 that the current mapping parameter is suitable, the mapping parameter is not updated.

In step S109, because it is determined in step S107 that the current mapping parameter is not suitable, the mapping parameter generating unit 6035 generates new mapping parameter based on the estimated values for the histogram that is generated in step S106. That is, the mapping parameter is updated. In this context, the mapping parameter is generated such that the tone becomes a low compression rate for the high frequency portions of the histogram in order for the largest amount possible of the tone information for the image to be left behind.

FIG. 12(A)-FIG. 12(D) are diagrams that schematically show examples of histograms and mapping parameters, and are diagrams for explaining the method for generating a mapping parameter from a histogram. FIGS. 12(A), and (B) show examples of a histograms for a pixel values. FIG. 12(C) shows one example of a mapping parameter that are generated based on the histogram for FIG. 12(A). FIG. 12(D) shows one example of a mapping parameter that are generated based on the histogram for FIG. 12(B).

In the case of a high luminance subject, a histogram such as that in FIG. 12(A) is generated. In FIG. 12(A), a large number of pixel values exist on the high luminance side. In this case, mapping parameter is generated so as to lower the compression rate of the high luminance side as in FIG. 12(C). Note that in order to aid the understanding of FIGS. 12(C), and (D), the graph that shows the corresponding relationship between input luminance and output luminance becomes linear (a proportional straight line) in a case of a mapping parameter in which the entire region for input luminance has an equal compression ratio.

In contrast, In the case of a low luminance subject, a histogram such as that in FIG. 12(B) is generated. In FIG. 12(B), a large number of pixel values exist on the low luminance side, and therefore, mapping parameter such that the compression rate for the low luminance side is decreased is generated as in FIG. 12(D).

As was explained above, an example has been given of a method that compares the compression rate for the luminance in each pixel and the frequency of pixel values for each of these luminances, and determines that the parameter is not suitable in a case in which a frequency is occurring that is at or above a threshold in the luminance with a high compression rate as an example of a method for determining whether or not the mapping parameter is suitable. From FIG. 12, it can be understood that in a case in which, for a particular mapping parameter a frequency is occurring that is at or above a threshold in the histogram in a luminance region with a high degree of compression, this mapping parameter is not suitable.

In the case of a conventional image tone compression method, there are many cases in which the compression rate is set as high for the high luminance side in particular. In cases in which image recognition processing is performed using such compression rate settings, the tone information will decrease for pixel regions having a luminance with a high compression rate, and therefore, the outlines of subjects in regions in the image that have a high luminance will become blurred, and it is thereby possible that the recognition precision for these subjects will be lowered. In contrast, if the compression rate is low, the bit depth will become deeper, delays in transmission, reception, and recognition processing will increase, and this will slow down the control of the vehicle.

In relation to this, in the Present Embodiment, once a first accumulation period that is shorter than a full frame period is over, this image signal is output. Then, the image processing unit 603 generates a mapping parameter from a histogram for the pixel values for the first accumulation period, then performs tone mapping processing on an image signal during the second accumulation period using the mapping parameter. That is, the image processing unit 603 and the recognition unit 604 are able to start processing for an image signal that has been compressed with a low bit by tone mapping processing before the accumulation period for one full frame is over. It is thereby possible to realize a reduction in delays during image processing and image recognition processing. In addition, the mapping parameter generating unit 6035 generates a mapping parameter such that the compression rate for tones with a high frequency of pixel numbers becomes low. It is thereby possible for the necessary tone information for the image signal such as, for example, the subject composition, or the like, to be left behind during tone mapping processing (to suppress insufficiencies in tones). It is thereby possible to suppress decreases in the precision of the recognition processing by the recognition unit 604. That is, in the Present Embodiment, it is possible to realize reductions in processing delays while suppressing decreases in image recognition precision.

Second Embodiment

Figure 13:
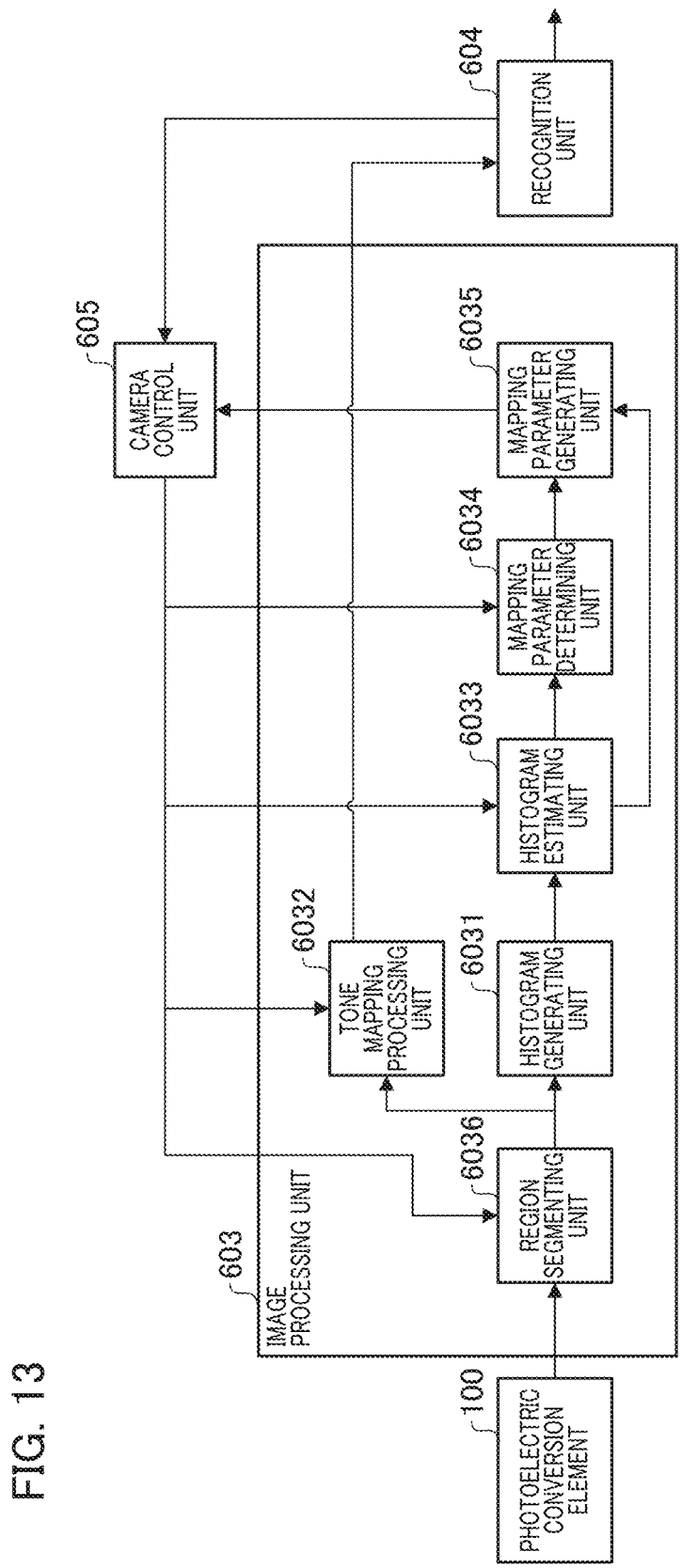
FIG. 13 is a block diagram that shows an example of a functional configuration of an image processing unit according to an embodiment.

Below, a Second Embodiment of the present invention will be explained. In the Second Embodiment, explanations of the elements and functions that are the same as those in the above-described First Embodiment will be omitted or simplified, and an explanation will be given primarily of the points that differ between the two. FIG. 13 is a block diagram showing an example of a functional configuration of primarily the image processing unit 603. In addition to the configuration of the image processing unit 603 of the above-explained First Embodiment, the image processing unit 603 further has a region segmenting unit 6036.

Figure 15:
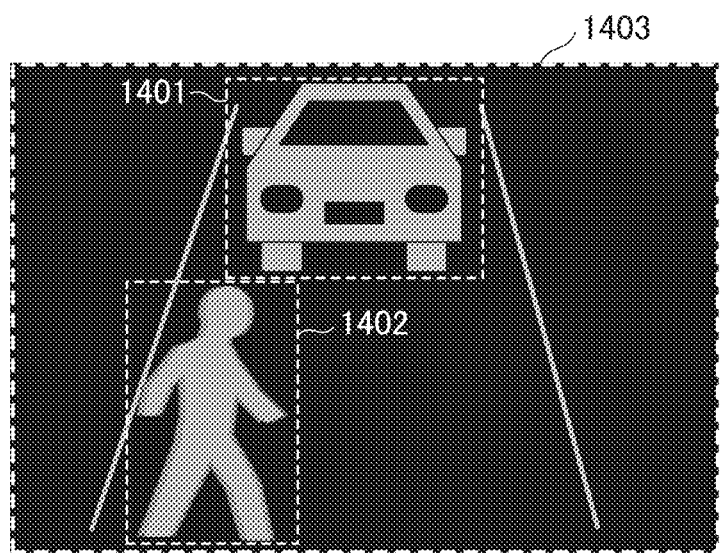
FIG. 15 is a diagram that shows one example of an image on which region segmentation has been performed based on recognition results of a recognition unit.

The region segmenting unit 6036 performs segmentation for regions in an image corresponding to a signal that is output from the photoelectric conversion element 100. In this context, regions that are segmented based on the recognition results that are output from the recognition unit 604, which will be explained below, are used. FIG. 15 shows one example of an image on which region segmentation has been performed based on the recognition results of the recognition unit 604. A region 1401 in the image is a region in which a vehicle has been recognized. A region 1402 is a region in which a person has been recognized. A region 1403 is a region in which the region 1401 and the region 1402 have been removed from inside the image.

The mapping parameter generating unit 6035 generates a mapping parameter for each of the region 1401, the region 1402, and the region 1403. The image signal that has been output from the region segmenting unit 6036 is output to the tone mapping processing unit 6032 and the histogram generating unit 6031.

The histogram generating unit 6031 generates a histogram for the pixel values during the accumulation period by using an image signal that has been output from the region segmenting unit 6036. At this time, the histogram generating unit 6031 generates a histogram for the pixel values for each of the regions that have been segmented. The histograms that have been generated for each of the segmented regions are output to the histogram estimating unit 6033. There are also cases in which the regions that have been segmented are referred to below as segmented regions.

The tone mapping processing unit 6032 performs mapping processing for the tone for the image signal that has been output from the region segmenting unit 6036. At this time, the tone mapping processing unit 6032 uses the regions that have been output from the region segmenting unit 6036 and the mapping parameter that have been output from the mapping parameter generating unit 6035 and performs tone mapping processing for each segmented region. The bit depth for the image is thereby compressed. The image signal that has been output from the tone mapping processing unit 6032 is output to the recognition unit 604.

The recognition unit 604 performs recognition processing on the image that has been processed by the tone mapping processing unit 6032. The recognition results that are generated from the recognition processing include information such as the position of a subject, the recognition precision of a subject, the type of subject, and the like. The recognition results that have been generated are output to the camera control unit 605, and the ECU 701.

In addition to outputting a control signal to each functional block, receiving the mapping parameter, outputting the mapping parameter, and outputting the information for the exposure time, the camera control unit 605 also receives the recognition results for the image from the recognition unit 604. In addition, the camera control unit 605 outputs these recognition results to the region segmenting unit 6036 in order for the region segmenting unit 6036 to perform region segmentation processing.

Figure 14:
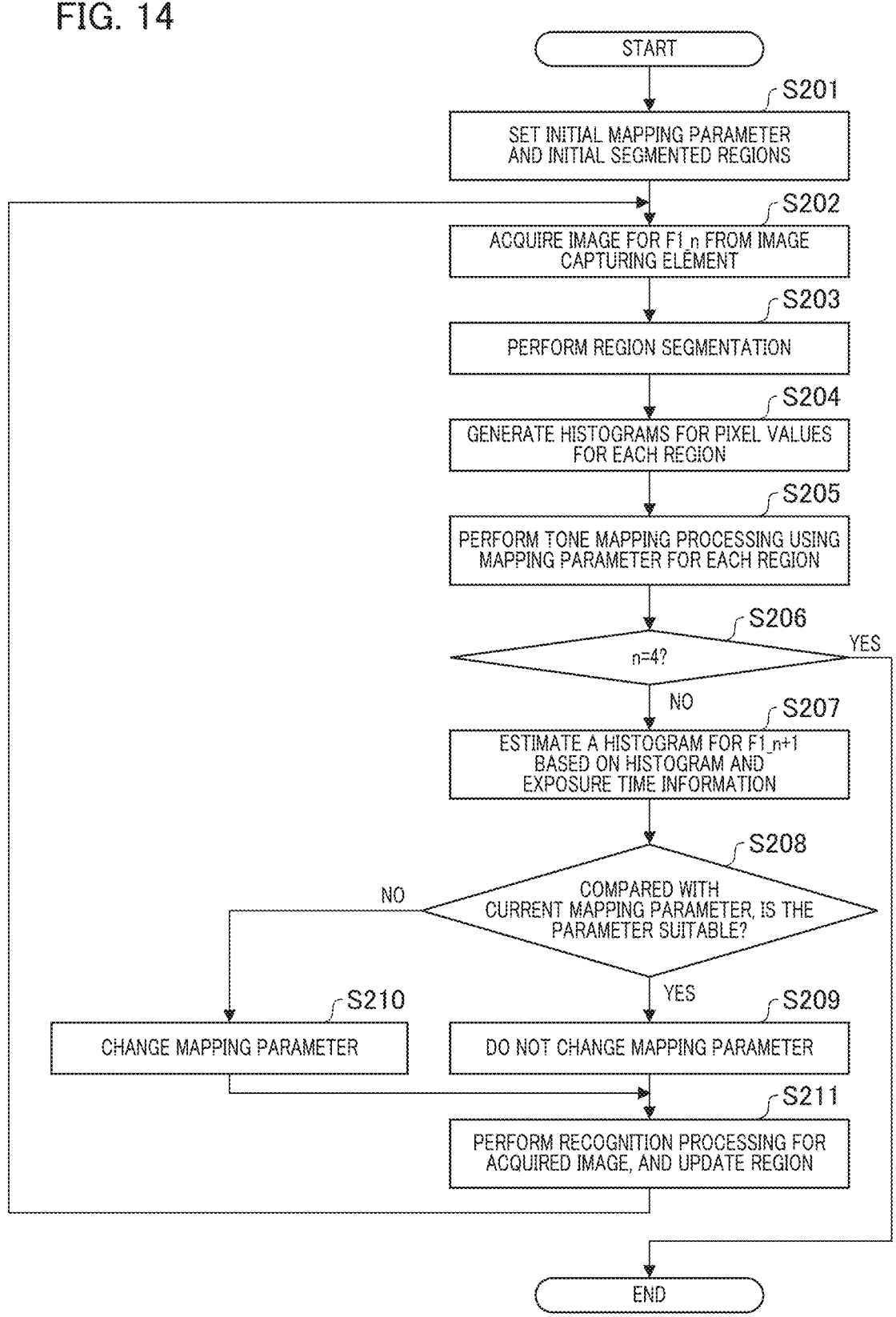
FIG. 14 is a flowchart that shows tone mapping processing according to an embodiment.

FIG. 14 is a flowchart showing the tone mapping processing according to the Second Embodiment. The present processing is realized by the CPU of the camera control unit 605 reading out a computer program according to the processing contents, loading this onto a memory, and executing it.

In step S201 of FIG. 14, the camera control unit 605 sets the initial values for the mapping parameter, and the initial segmented regions for the image signal. At this time, the initial values for the mapping parameter and the initial segmented regions may be values and regions that have been determined in advance, or they may also be values and regions that are used for the previous frame.

Next, in step S202, the camera control unit 605 acquires the image for the frame 1_*n* from the image capturing element.

In step S203, the region segmenting unit 6036 performs region segmentation on the image that has been acquired. At this time, in a case in which recognition results are output in step S211, which will be described below, region segmentation is performed according to the subject position in the recognition results.

In step S204, the histogram generating unit 6031 generates a histogram for the pixel values by using the image signal that has been acquired. In this case, the histogram generating unit 6031 generates a histogram for the pixel values for each region that is segmented in step S203.

In step S205, the tone mapping processing unit 6032 performs tone mapping processing by using the mapping parameter that has been set. At this time, tone mapping processing is performed for each region that is segmented in step S203. By performing tone mapping processing, it is possible to compress the bit depth for the image.

Step S206 is the same as step S105 shown in FIG. 11, and therefore an explanation will be omitted.

In step S207, the histogram estimating unit 6033 estimates a histogram for the pixel values in the image for the frame 1_$n$+1 from the histogram that is generated in step S204 and the length of the exposure time (accumulation period) for the frame 1_$n$+1. At this time, histograms are estimated for each segmented region.

In step S208, the mapping parameter determining unit 6034 compares the estimated values for the histograms that are generated in step S207 and the mapping parameter that is used in step S205, and performs a determination for whether or not the parameter is suitable for each segmented region. In a case in which the parameter is suitable in each segmented region, the processing transitions to step S209. In a case in which there is a region for which the parameter is not suitable, the processing transitions to step S210.

In step S209, it is determined in step S208 that the current mapping parameters for all of the regions are suitable, and therefore, the mapping parameters are not updated.

In step S210, it is determined in step S208 that there are regions for which at least one of the current mapping parameters are not suitable, and therefore, the mapping parameter generating unit 6035 generates (updates) new one or more mapping parameters based on the estimated values for the histograms that are generated in step S207. In this context, mapping parameters are generated for each segmented region.

In step S211, the recognition unit 604 performs recognition processing on the acquired image. The region segmenting unit 6036 sets subject regions that are output from the recognition unit 604 to serve as recognition results as the segmented regions in the frame 1_$n$+1 (updates the segmented region). The region segmenting unit 6036 is one example of a processing unit that performs segmentation of regions in an image based on recognition results from the recognition unit 604.

As was described above, in the Present Embodiment, along with being able to obtain the same effects as in the above-described First Embodiment, it is also possible to generate more suitable mapping parameters for each segmented region according to the recognition results for the recognition unit 604, and to apply these to the tone mapping processing. As a result, the tone mapping processing unit 6032 is able to perform highly precise tone mapping processing for each segmented region. That is, it is possible to increase the effect of suppressing insufficient tones of the image signal that are necessary for the subject composition or the like. It is thereby possible to increase the precision of the recognition processing by the recognition unit 604.

OTHER EMBODIMENTS

For example, although in the above embodiments, the shortest accumulation period (the accumulation period for frame 1_1), as is shown in FIG. 9, is ¼ of a full frame period, this may also be changed to, for example, ⅕ of a full frame period, ⅓ of a full frame period, or the like.

Furthermore, even in a case in which a readout cycle is made once for each ¼ of a full frame period, the counter circuit may also be reset during the accumulation period for the frame 1_1 of FIG. 9 according to the brightness of the subject, the subject recognition precision, or the like. In addition, it is also possible to thereby make a more substantial accumulation period shorter than ¼ of a full frame period.

Conversely, at the time period T1 or the like of FIG. 9, the counter circuit may also be temporarily reset. It may thereby be made such that the count value that is readout at the time T4 is adjusted.

In the processing that is shown in FIG. 11, although the histogram generation is performed first and the tone mapping processing is performed after this (Steps S103, and S104), this order may also be reversed. The same also applies to the processing shown in FIG. 14 (Steps S204, and S205).

In the above Second Embodiment, although the region segmentation unit 6036 performed region segmentation on all of the frames that are acquired from the photoelectric conversion element 100, it may also be made such that, for example, region segmentation is performed during a set period for each frame, such as for every other frame, or the like.

As was shown in FIG. 7, the image processing unit 603 is provided as a portion of the functional blocks for the photoelectric conversion device 600. However, the image processing unit 603 and the photoelectric conversion device 600 may also be separate apparatuses that are connected to each by a wired or wireless connection.

A portion or the entirety of the computer programs that execute the functions for the above-descried embodiment for the control in the present examples may also be made so as to be supplied to the photoelectric conversion apparatus via a network or each type of storage medium. In addition, the computer (or CPU, MPU, or the like) in this photoelectric conversion device may also be made so as to readout and execute the program. In this case, this program as well as the storage medium on which this program has been stored are included in the scope of the present disclosure.

Although exemplary embodiments of the present disclosure have been described above, the present disclosure is not limited to the above embodiments, and various changes are possible based on the gist of the present disclosure, and these are not excluded from the scope of the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-104159, filed Jun. 26, 2023, which is hereby incorporated by reference wherein in its entirety.

What is claimed is:

1. A photoelectric conversion device comprising:
a plurality of pixels each of which is configured to include a sensor unit that generates a pulse at a frequency corresponding to a photon reception frequency, and a counter that counts a number of the pulses; and
at least one processor or circuit configured to function as:
a control unit configured to control the plurality of pixels such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period;
a processing unit configured to generate a mapping parameter and perform tone mapping processing on the image signal using the mapping parameter;
wherein the processing unit is configured to generate a histogram for pixel values based on the image signal, and to generate the mapping parameter based on the histogram for pixel values; and
further wherein the processing unit is configured to estimate a histogram for pixel values during the second accumulation period based on a histogram for pixel values during the first accumulation period and information for the second accumulation period, and to generate the mapping parameter based on the histogram for the pixel values during the second accumulation period that has been estimated.

2. The photoelectric conversion device according to claim 1, wherein the processing unit is configured to compare the generated mapping parameter with the estimated histogram for pixel values during the second accumulation period, and thereby determines whether or not the mapping parameter is suitable.

3. The photoelectric conversion device according to claim 1, wherein the processing unit is configured to perform segmentation of regions in an image corresponding the image signal, and to perform the tone mapping processing for each of the regions.

4. The photoelectric conversion device according to claim 3, wherein the at least one processor or circuit is further configured to function as, a recognition unit configured to recognize subjects based on an image signal corresponding to a signal generated during at least the first accumulation period, which is a signal on which the tone mapping processing has been performed,
wherein the processing unit is configured to perform region segmentation on the image based on the results of the subject recognition.

5. The photoelectric conversion device according to claim 1, wherein the at least one processor or circuit is further configured to function as, a recognition unit configured to recognize subjects based on an image signal corresponding to a signal generated during at least the first accumulation period, which is a signal on which the tone mapping processing has been performed.

6. The photoelectric conversion device according to claim 1, wherein the at least one processor or circuit is further configured to function as, a processing unit is configured to perform the tone mapping processing after the generation of the histogram for pixel values.

7. The photoelectric conversion device according to claim 1, wherein the first accumulation period is shorter than the second accumulation period.

8. The photoelectric conversion device according to claim 1, wherein the first accumulation period and the second accumulation period overlap with each other.

9. The photoelectric conversion device according to claim 1, wherein the first accumulation period and the second accumulation period start at the same time.

10. The photoelectric conversion device according to claim 1, wherein an end time of the second accumulation period coincides with an end time of the full frame.

11. The photoelectric conversion device according to claim 1, wherein the at least one processor or circuit is further configured to function as, a display unit configured to display a signal that is generated during at least the second accumulation period to serve as an image.

12. An image processing device configured to process an image signal from a photoelectric conversion device having a plurality of pixels each of which is configured to include a sensor unit that generates a pulse at a frequency corresponding to a photon reception frequency, and a counter that counts a number of the pulses, the image processing device comprising:
at least one processor or circuit configured to function as
a processing unit configured to generate a mapping parameter, and perform tone mapping on an image signal that is output from the plurality of pixels using the mapping parameter;
wherein the photoelectric conversion device is configured to control the plurality of pixels such that they generate a signal is generated based on a difference count values for the counter between a start time and an end time for a plurality of different accumulation periods within a full frame period, and such that a signal that is generated during a first accumulation period is output between a time from an end of the first accumulation period until an end of a second accumulation period,
wherein the processing unit is configured to generate a histogram for pixel values based on the image signal, and to generate the mapping parameter based on the histogram for pixel values; and
further wherein the processing unit is configured to estimate a histogram for pixel values during the second accumulation period based on a histogram for pixel values during the first accumulation period and information for the second accumulation period, and to generate the mapping parameter based on the histogram for the pixel values during the second accumulation period that has been estimated.

13. A movable apparatus having a photoelectric conversion device, wherein the photoelectric conversion device comprises:
a plurality of pixels each of which is configured to include a sensor unit that generates a pulse at a frequency corresponding to a photon reception frequency, and a counter that counts a number of the pulses; and
at least one processor or circuit configured to function as:
a control unit configured to control the plurality of pixels such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period; and a processing unit configured to generate a mapping parameter and perform tone mapping processing on the image signal using the mapping parameter, wherein the movable apparatus comprises: at least one processor or circuit configured to function as a movement control unit configured to control a movement of the movable apparatus based on results of recognition processing using the image signal, wherein the processing unit is configured to generate a histogram for pixel values based on the image signal, and to generate the mapping parameter based on the histogram for pixel values; and further wherein the processing unit is configured to estimate a histogram for pixel values during the second accumulation period based on a histogram for pixel values during the first accumulation period and information for the second accumulation period, and to generate the mapping parameter based on the histogram for the pixel values during the second accumulation period that has been estimated.

14. A method for a photoelectric conversion device that has a plurality of pixels each of which is configured to include a sensor unit that generates a pulse at a frequency corresponding to a photon reception frequency, and a counter that counts a number of the pulses; the method comprising:

controlling the plurality of pixels such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period;

generating a mapping parameter;

performing tone mapping processing on the image signal using the mapping parameter;

generating a histogram for pixel values based on the image signal, wherein the mapping parameter is based on the histogram for pixel values; and estimating a histogram for pixel values during the second accumulation period based on a histogram for pixel values during the first accumulation period and information for the second accumulation period, and the mapping parameter is generated based on the histogram for the pixel values during the second accumulation period that has been estimated.

15. A non-transitory storage medium storing a control program of a photoelectric conversion device that has a plurality of pixels each of which is configured to include a sensor unit that generates a pulse at a frequency corresponding to a photon reception frequency, and a counter that counts a number of the pulses, the control program causing a computer to perform each step of a processing method for the photoelectric conversion device, the method comprising:

controlling the plurality of pixels such that a signal is generated based on a difference between count values for the counter between a start time and an end time for a plurality of different accumulation periods within a full frame period, and such that an image signal that is generated during a first accumulation period is output between a time from an end of the first accumulation period until an end of a second accumulation period;

generating a mapping parameter;

performing tone mapping processing on the image signal using the mapping parameter;

generating a histogram for pixel values based on the image signal, wherein the mapping parameter is based on the histogram for pixel values; and estimating a histogram for pixel values during the second accumulation period based on a histogram for pixel values during the first accumulation period and information for the second accumulation period, and the mapping parameter is generated based on the histogram for the pixel values during the second accumulation period that has been estimated.

* * * * *